United States Patent [19]
Tokura

[11] Patent Number: 5,812,891
[45] Date of Patent: Sep. 22, 1998

[54] CAMERA HAVING A SPOOL WITH AT LEAST ONE ELECTRICAL COMPONENT DISPOSED THEREIN

[75] Inventor: Go Tokura, Kanagawa-ken, Japan

[73] Assignee: Canon Kabushiki Kaisha, Tokyo, Japan

[21] Appl. No.: 814,455

[22] Filed: Mar. 10, 1997

Related U.S. Application Data

[63] Continuation of Ser. No. 283,405, Aug. 1, 1994, abandoned.

[30] Foreign Application Priority Data

Aug. 5, 1993 [JP] Japan .................................. 5-194525

[51] Int. Cl.[6] .................................................. G03B 17/02
[52] U.S. Cl. ............................ 396/538; 396/539; 396/542
[58] Field of Search ..................................... 396/439, 535, 396/538, 539, 542

[56] References Cited

U.S. PATENT DOCUMENTS 5,001,505  3/1991  Tosaka et al. ....................... 354/288 X Primary Examiner—Eddie C. Lee
Assistant Examiner—J. K. Han
Attorney, Agent, or Firm—Robin, Blecker & Daley

[57] ABSTRACT

A camera includes a spool, a circuit board which is disposed on an extension of an axis of the spool, and circuit parts which are mounted on the circuit board. A part of a specific one of the circuit parts is inserted into the inside of the spool.

13 Claims, 5 Drawing Sheets

CAMERA HAVING A SPOOL WITH AT LEAST ONE ELECTRICAL COMPONENT DISPOSED THEREIN

This is a continuation application under 37 CFR 1.62 of prior application Ser. No. 08/283,405, filed Aug.1, 1994, now abandoned.

BACKGROUND OF THE INVENTION

1. Field of the Invention

This invention relates to a camera having an electric part disposed within the camera.

2. Description of the Related Art

The cameras of today are generally provided with built-in flash devices, irrespective as to whether the cameras are of the lens-shutter type or the single-lens reflex type. The flash device is controlled by a flash device control circuit which forms a large current system operating at a high voltage. Therefore, component parts of this circuit include many large parts necessitating the circuit to occupy a space which is large both in area and volume within the camera.

Meanwhile, the general demand for "a smaller size" camera still persists in the world. To meet this demand, the pursuit of further reduction in size of cameras seems to be becoming intenser. Such being a general trend, it is important for reduction in size of cameras to more efficiently and more densely arrange such component parts that occupy large spaces. In the case of an ordinary flash device control circuit, large electric parts to be taken into consideration include a circuit board, a main capacitor, a limiting coil, a boosting transformer, a light-amount adjusting thyristor, etc.

A manner in which these component parts have been actually mounted and on which this invention is based described by way of example as follows FIG. 5 is a rough sectional view showing a camera as viewed from behind. FIG. 6 shows a top view as viewed with parts removed from the camera until a flash device control circuit is exposed. In these figures, reference numeral 1 denotes a camera body. Reference numeral 2 denotes a spool. A hole 1' which is provided in the camera body 1 above a spool chamber communicates with a space 2' provided within the spool 2. A motor 3 is disposed in the space 2' within the spool 2. An upper base plate 4 for the spool 2 is secured to the camera body 1. A cylindrical protruding part 4' which protrudes from the base plate 4 is arranged to have the upper end part of the spool 2 rotatably fitted on and carried by the outer circumference thereof. A flash device circuit board 5 is arranged to have a flash device control circuit mounted thereon and to cover the upper side of the spool 2. On the flash device circuit board 5 are mounted large electric parts, such as a limiting coil 6, a main capacitor 7, a light-amount adjusting thyristor 8, a boosting transformer 9, etc. In addition to them, many small electric parts 10 and 10' are mounted also on the circuit board 5 although some of the small electric parts are omitted from the illustration. The limiting coil 6 and the main capacitor 7 are arranged in a state of vertically overlapping each other and are mounted on the lower side of the flash device circuit board 5 together with the light-amount adjusting thyristor 8. Further, they are disposed in such positions within the camera body 1 that they are outside of the spool chamber and are located between the camera body 1 and an external fitting part 11. The boosting transformer 9 is mounted on the upper side of the flash device circuit board 5 together with other thin small electric parts 10. An external display unit 12 is disposed above the flash device control circuit, leaving between them a space which is just sufficient to contain the height of the boosting transformer 9 and the small electric parts 10. The external display unit 12 is covered with an upper cover 14, which defines in part the appearance of the camera with an external display window 13 formed therein.

The motor 3 has terminals 15-a and 15-b which are arranged in an upper part of the camera with lead wires 16-a and 16-b soldered (16-a' and 16-b') to the terminals 15-a and 15-b. The lead wires 16-a and 16-b are respectively pulled out to the upper part of the upper base plate 4 and further extend to be connected to a motor control circuit which is not shown.

In FIG. 6, a part encompassed with a break line 27 shows the pulled-out portions of the lead wires 16-a and 16-b of the motor 5. These portions are disposed on the upper base plate 4 below the flash device circuit board 5. The upper base plate 4 has holes 28-a and 28-b which are provided for pulling out these lead wires and are disposed almost directly above the motor terminals 15-a and 15-b. The motor 3 is supported by a base plate (not shown) which is disposed in a lower part of the camera. The output shaft 17 of the motor 3 is connected to a driving system 18 which is arranged to cause the camera to act. Batteries 19-a and 19-b are disposed within a grip member 20 of the camera. A mirror box unit 21 includes such mechanical parts as a mirror driving system, a shutter driving system, etc., together with some electric circuit parts.

When the parts are actually mounted in the manner as described above, the position of the external display unit 12 is determined by the the height of the boosting transformer 9. In this state, for such other small electric parts 10 that are thin, a space between the upper sides of these small parts 10 and the external display unit 12 cannot be fully utilized and thus becomes a dead space, which eventually increases the size of the camera.

Even if the boosting transformer 9 is mounted on the lower side of the flash device circuit board 5 instead of the upper side thereof, the height of the position at which the flash device circuit board 5 is disposed is no longer determined by the height of other small electric parts 10' but has to be determined by the height of the boosting transformer 9 as the position from the upper face of the camera body 1 or the upper base plate 4. As a result, the height of the display unit 12 remains unchanged and, therefore, the size of the camera remains unchanged by such a change.

In order to lower the height of the position of the display unit 12 in the circuit arrangement of this flash device control circuit, the display unit 12 and the boosting transformer 9 must be disposed in positions where they do not vertically overlap each other. Then, for that purpose, the display unit 12 must be arranged to have a smaller area. Such arrangement, however, limits the contents of a display to be made or deteriorates the visibility of the display and, therefore, greatly affects the specifications of the camera.

Further, in a case where the display unit 12 is arranged to slant as shown in FIG. 5, the boosting transformer 9 has been disposed as close as possible to the optical axis of the camera (leftward as viewed on the drawing) for the purpose of minimizing the adverse effect of the height of the boosting transformer 9. However, this arrangement causes an increase in the area of the flash device circuit board 5 and thus results in an increase in cost. Further, in respect of the internal wiring for the flash device circuit board 5, the length of wiring is preferably minimized. Therefore, the arrangement of shifting the position of the boosting transformer 9 toward the optical axis of the camera is not desirable also in that respect.

SUMMARY OF THE INVENTION

This invention is directed to the solution of the problems of the conventional camera described in the foregoing. One aspect of this invention therefore resides in the provision of a camera which is of the above-stated type but can be arranged in a smaller size than the conventional camera, by mounting a specific electric part having a relatively large height on the lower side of a circuit board and by having a part of the specific electric part inserted into a spool chamber.

The above and other aspects and features of this invention will become apparent from the following detailed description of embodiments thereof taken in connection with the accompanying drawings.

DETAILED DESCRIPTION OF THE PREFERRED EMBODIMENTS

Figure 1:
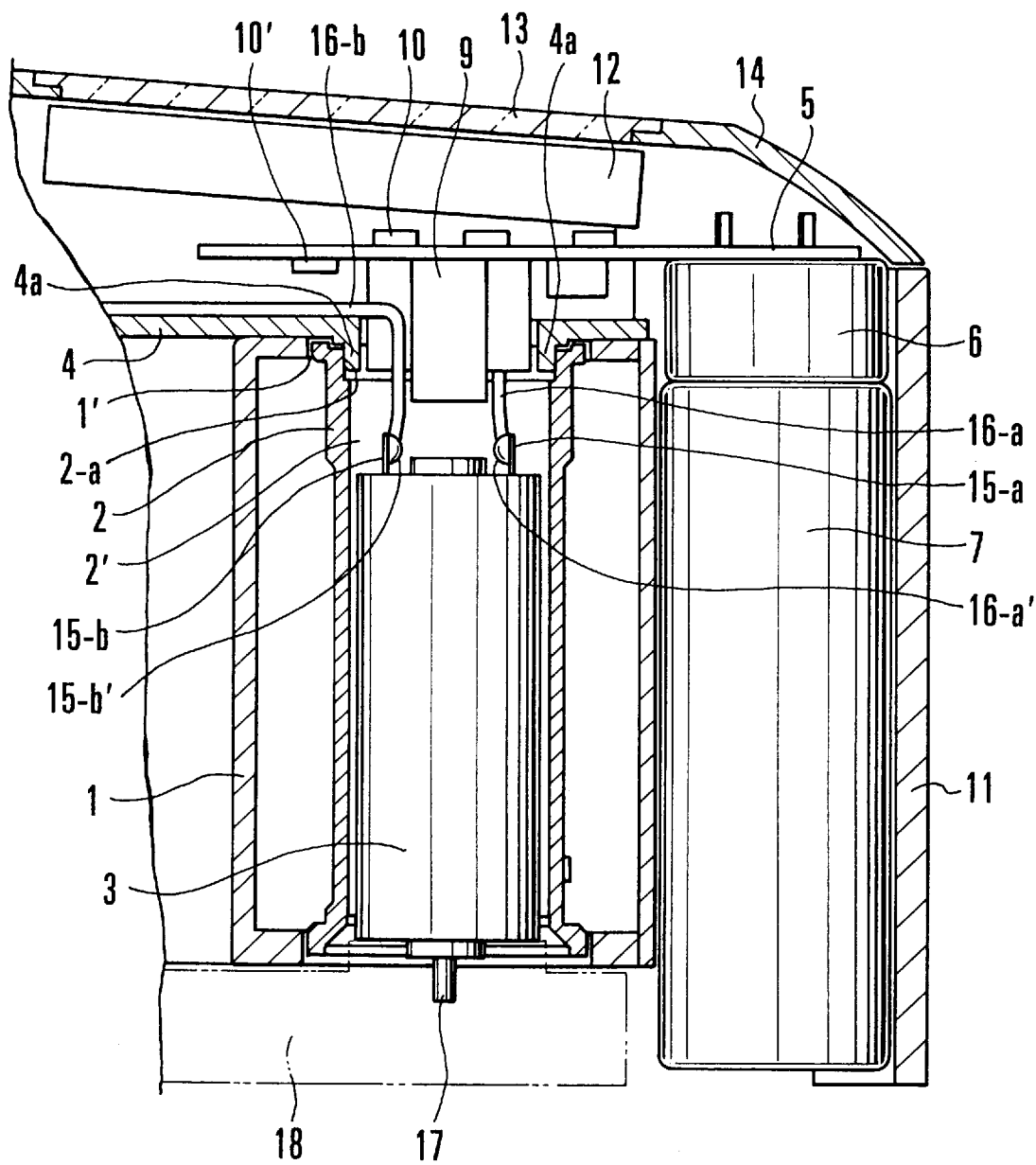
FIG. 1 is a vertical sectional view taken across a spool chamber of a camera which is arranged according to this invention as a first embodiment thereof.
Figure 2:
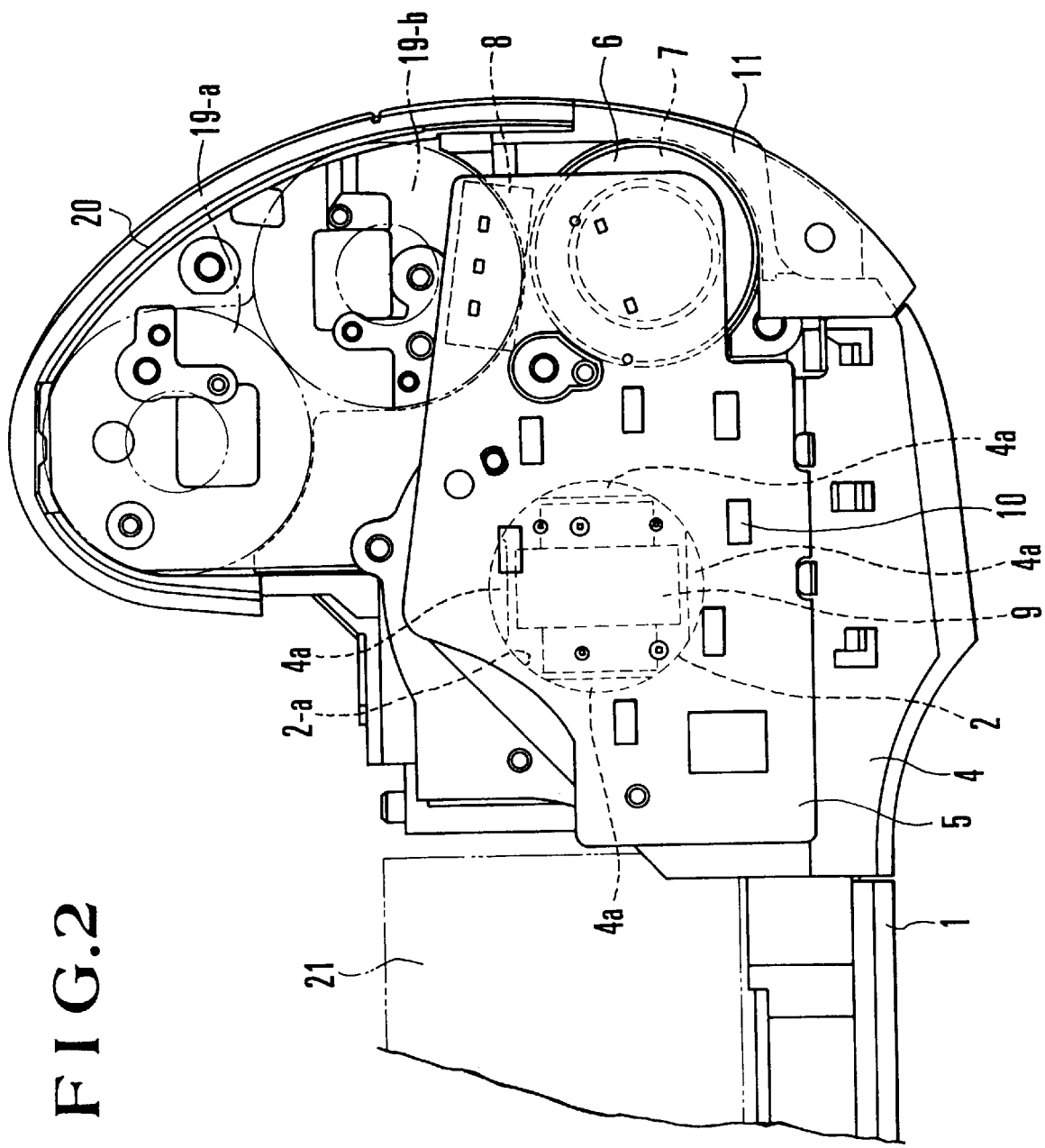
FIG. 2 is a top view showing the neighborhood of the spool chamber of the same camera.

FIGS. 1 and 2 show a camera which is a first embodiment of this invention. FIG. 1 is a vertical sectional view showing in outline the arrangement of the camera as viewed from the rear side of the camera. FIG. 2 is a top view showing the same camera by removing parts until a flash device control circuit appears.

In these figures, reference numeral 1 denotes a camera body. Reference numeral 2 denotes a hollow cylindrical spool 2 which is arranged to allow a film pulled out from a cartridge to be wound therearound. A hole 1' is formed in the camera body 1 above a spool chamber and communicates with a space 2' left within the spool 2. A motor 3 is disposed in the space 2' within the spool 2. An upper base plate 4 for the spool 2 is secured to the camera body 1 and is provided with four bow-shaped sliding contact parts 4a (see FIG. 2) which protrude from the upper base plate 4 and serve as bearing members for the upper end of the spool 2. An upper end inner circumferential face 2-a of the spool 2 is rotatably fitted on the outer circumferential faces of the sliding contact parts 4a.

A flash device circuit board 5 is arranged to carry a flash device control circuit and to cover the upper side of the spool 2. A limiting coil 6, a main capacitor 7, a light-amount adjusting thyristor 8, a boosting transformer 9, etc., which are large electric parts are mounted on the flash device circuit board 5 together with other many small electric parts 10 and 10'. Some of these small electric parts are omitted from the illustration. In the case of this embodiment, the limiting coil 6 and the main capacitor 7 are arranged to vertically overlap each other, to be mounted on the lower side of the flash device circuit board 5 together with the light-amount adjusting thyristor 8, and to be outside of the spool chamber of the camera body 1 between an external fitting part 11 and the camera body 1. The boosting transformer 9 is also mounted on the lower side of the flash device circuit board 5. However, a part of the boosting transformer 9 is inserted, through the hole 1' provided in the camera body 1, into the space 2' left within the spool 2. Further, on the lower side of the flash device circuit board 5 other small electric parts 10' are mounted, and many other electric parts 10 are mounted on the upper side of the flash device circuit board 5. Above the upper side of the flash device circuit board 5, there is arranged an external display unit 12, leaving a space just enough for containing the heights of the electric parts 10 between the display unit 12 and the circuit board 5. An upper cover 14 which has an external display window 13 covers the external display unit 12 to define in part the outside shape of the camera.

As shown in FIG. 1, the motor 3 has terminals 15-a and 15-b on its upper side. Lead wires 16-a and 16-b are soldered to the terminals 15-a and 15-b as indicated by parts 16-a' and 16-b'. The lead wires 16-a and 16-b are pulled out to the upper side of the upper base plate 4 and further extend to be connected to a motor control circuit which is not shown. The motor 3 is carried by a base plate which is not shown in the lower part of the camera. The output part 17 of the motor 3 is connected to a driving system 18 arranged to cause the camera to act.

Referring to FIG. 2, batteries 19-a and 19-b are disposed within a grip member 20 of the camera. A mirror box unit 21 includes mechanical parts such as a mirror driving system and a shutter driving system together with some electric circuit parts.

Figure 3:
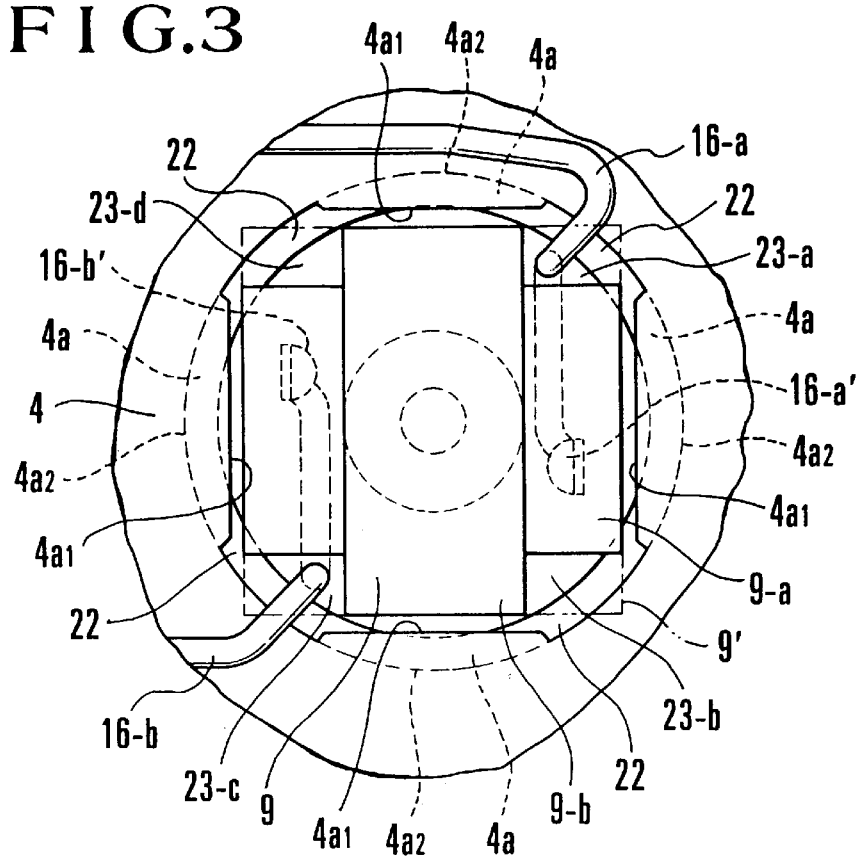
FIG. 3 is an enlarged top view showing the neighborhood of the spool chamber of the same camera.

FIG. 3 shows the booting transformer 9 and parts around it in a state of being looked through the flash device circuit board 5. The boosting transformer 9 is generally arranged to have a support frame 9-b around a bobbin 9-a and has a sectional shape as shown by full lines in the drawing. Assuming that the maximum external shape in this sectional view is in a square shape 9', the sliding contact parts 4a mentioned above are formed to have cylindrical faces 4a2 and faces 4a1 which are parallel to the respective sides of the virtual square shape 9'. However, the sliding contact parts 4a do not exist in areas 22 opposed to the four corner angle parts of the virtual square shape 9'. In the case of the camera of this embodiment, therefore, the two lead wires 16-a and 16-b of the motor 3 are disposed in positions where the sliding contact parts 4a do not exist, i.e., in peripheral recess parts 23-a and 23-c which are at the corner angle parts of the virtual square shape 9' of the boosting transformer 9.

Further, the positions of the two lead wires 16-a and 16-b are not limited to the diagonally opposed recess parts 23-a and 23-c but can be disposed in any recessed parts, because it is not desirable to limit the direction in which the lead wires are to be pulled out in view of the fact that the terminal positions of the motor 3 are difficult to control as their positions greatly vary, depending on the method of fixing them and the fact that efficiency of the lead wire soldering work can be enhanced with the pulling-out direction not limited.

Figure 4:
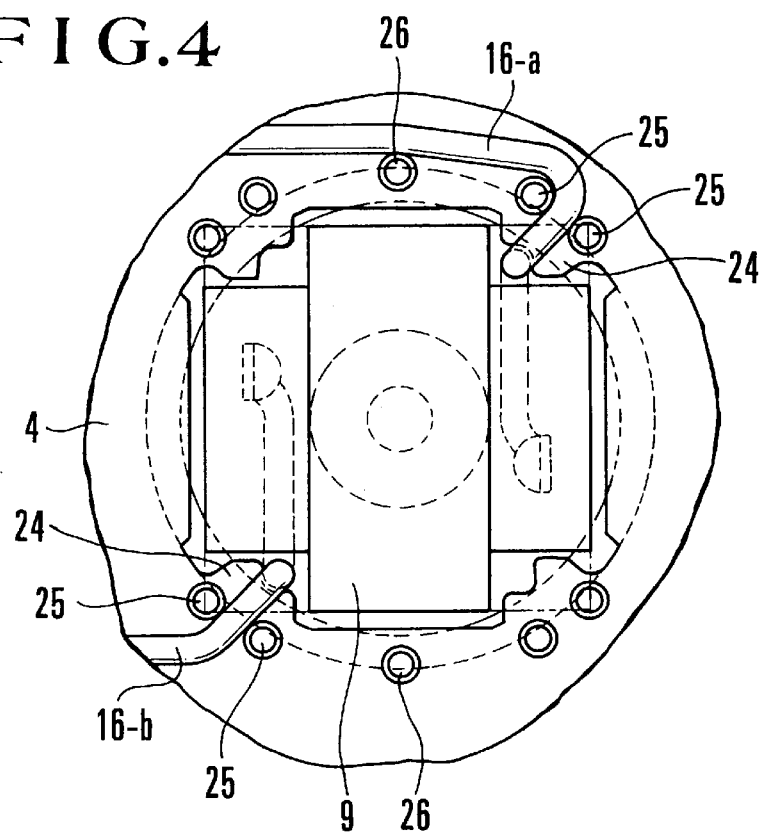
FIG. 4 is an enlarged top view showing the neighborhood of a spool chamber of a camera arranged as another embodiment of this invention.
Figure 5:
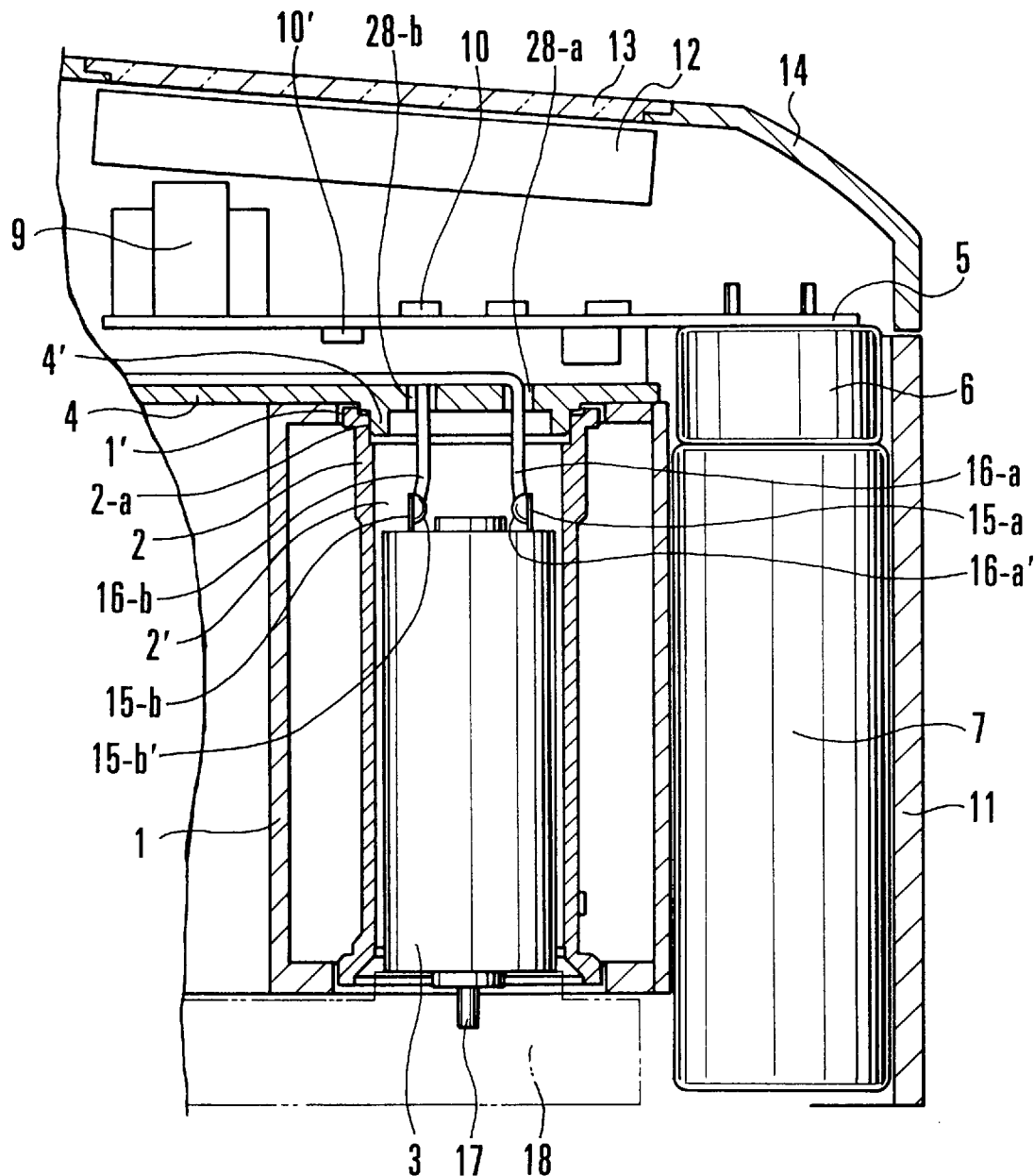
FIG. 5 is a vertical sectional view taken across a spool chamber of the conventional camera.
Figure 6:
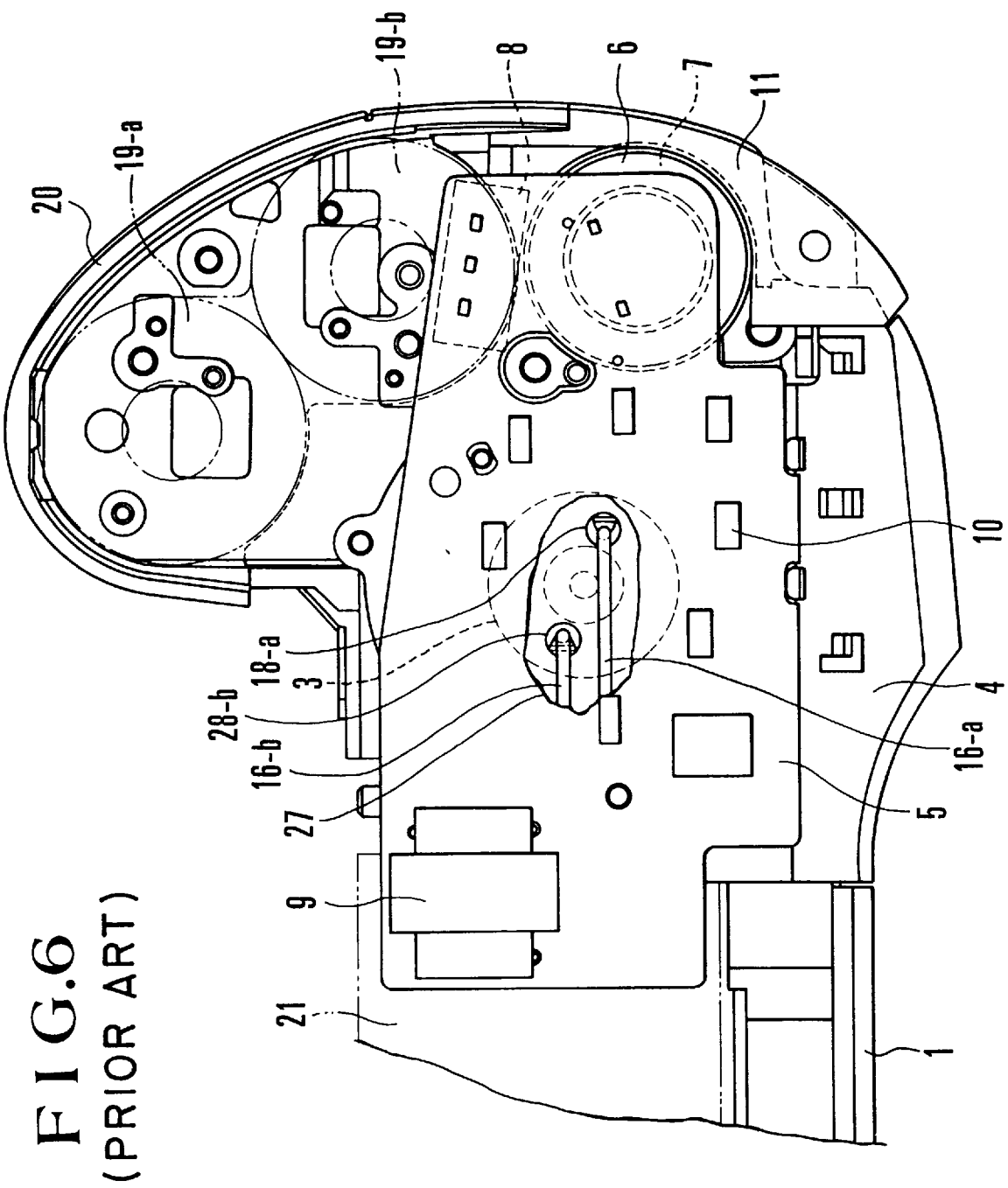
FIG. 6 is a top view showing the neighborhood of the spool chamber of the conventional camera.

FIG. 4 shows another embodiment of this invention. Similarly to FIG. 3, FIG. 4 shows the boosting transformer 9 and parts around it through the flash device circuit board 5. In this case, the lead wires 16-a and 16-b which are pulled out to the upper side of the upper base plate 4 are allowed to extend from their exit parts along guide projections 24 and also along a plurality of guide studs 25 provided on the upper side of the upper base plate 4 in such a way as to restrict the positions of the lead wires 16-a and 16-b. The lead wires 16-a and 16-b which are thus extended are connected to a motor control circuit which is not shown. The guide projections 24 are arranged in four parts corresponding to the four corner angle parts of the boosting transformer 9 and in such positions that facilitate pulling out and assembly work on the motor terminals and lead wires. The guide studs 25 are also set in positions corresponding to the four corner angle parts of the boosting transformer 9 and are arranged in pairs in such a way as to temporarily fix the lead wires 16-a and 16-b by sandwiching the lead wires in between each pair of the guide studs 25. In addition to the guide studs 25, a plurality of guide studs 26 are arranged to facilitate guiding the lead wires to the motor control circuit.

In the embodiments described above, a large electric part such as a boosting transformer or the like is mounted on the lower side of a circuit board which is disposed above the upper side of a spool chamber, and a part of the large electric part is inserted into a space left within the spool. Therefore, the height of the position of the flash device circuit board can be set lower to eliminate the dead spaces which would be left by the conventional arrangement, so that the size in the direction of height of the camera can be reduced.

Since no adverse effect is produced on the display unit, the invented arrangement allows a great amount of latitude in determining a display area and the contents of the display.

Since the boosting transformer can be mounted on approximately the middle part of the flash device circuit board, the wiring for other circuit parts of a large current system and a high voltage system, such as a light-amount adjusting thyristor, a main capacitor, etc., can be made short almost as desired. At the same time, since the area of the flash device circuit board does not have to be unnecessarily increased, the arrangement of the embodiment eventually permits reduction in cost.

Since the sliding contact parts 4a which serve as bearing members are not a cylindrical member continuing over the whole circumference of the spool, the diameter of the spool can be minimized taking into consideration the diameter of the motor and the external shape of the boosting transformer. The minimization of the spool diameter then contributes to reduction in the transverse size of the camera, so that the camera can be compactly arranged.

Further, since the lead-wire pulling-out positions are set at the peripheral recessed parts of the boosting transformer, the embodiment obviates the necessity of arranging a space solely for the purpose of pulling out the lead wires, so that spaces can be efficiently utilized. In addition to this advantage, control, fixing and assembly work on the parts such as the motor, etc., and soldering and disposing work on the lead wires can be freely carried out, so that the actual mounting of parts can be densely and compactly accomplished. The provision of the guide means for the lead wires further enhances the workability for assembly work, so that the rate of yield can be increased.

What is claimed is:

1. A camera comprising:

a spool;

a motor disposed inside of said spool;

a circuit board disposed above said spool; and a plurality of circuit parts mounted on said circuit board, a part of a specific one of said plurality of circuit parts being disposed inside of said spool, and said specific circuit part is mounted on a lower side of said circuit board and disposed directly above said spool.

2. A camera according to claim 1, further comprising a display device disposed in a position where said display device overlaps said circuit board.

3. A camera according to claim 2, wherein said circuit board and said display device are arranged adjacent to each other.

4. A camera according to claim 1, further comprising a base plate disposed between said spool and said circuit board and arranged to rotatably support said spool.

5. A camera according to claim 4, wherein a hole through which said specific circuit part is inserted is formed in said base plate.

6. A camera according to claim 1, wherein a wiring for said motor is pulled out from a neighborhood of said specific circuit part.

7. A camera having a circuit for a flash device, comprising:

a spool;

a motor disposed inside of said spool;

a circuit board disposed above said spool; and a plurality of circuit parts provided for the circuit for the flash device and mounted on said circuit board, a part of a specific one of said plurality of circuit parts being disposed inside of said spool, and said specific circuit part is mounted on a lower side of said circuit board and disposed directly above said spool.

8. A camera according to claim 7, wherein said specific circuit part is a boosting transformer.

9. A camera according to claim 8, wherein a coil, a capacitor and a thyristor are mounted as other circuit parts on said circuit board.

10. A camera according to claim 7, further comprising a display device disposed above said circuit board.

11. A camera according to claim 10, wherein said specific circuit part and circuit parts which are higher in height than other circuit parts are mounted on the lower side of said circuit board.

12. A camera according to claim 10, wherein a wiring for said motor is pulled out from a neighborhood of said specific circuit part.

13. A camera according to claim 10, further comprising a battery disposed in a neighborhood of said spool.

* * * * *